US011004210B2

(12) United States Patent
Givon et al.

(10) Patent No.: US 11,004,210 B2
(45) Date of Patent: May 11, 2021

(54) METHODS CIRCUITS DEVICES SYSTEMS AND ASSOCIATED COMPUTER EXECUTABLE CODE FOR EXTRACTION OF VISIBLE FEATURES PRESENT WITHIN A VIDEO FEED FROM A SCENE

(71) Applicant: GETALERT LTD., Herzliya Pituach (IL)

(72) Inventors: Dor Givon, Tel Aviv (IL); Yoram Elichai, Ashdod (IL); Gil Davidman, Herzliya Pituach (IL)

(73) Assignee: GETALERT LTD, Herzeliya (IL)

( * ) Notice: Subject to any disclaimer, the term of this patent is extended or adjusted under 35 U.S.C. 154(b) by 0 days.

(21) Appl. No.: 16/170,176

(22) Filed: Oct. 25, 2018

(65) Prior Publication Data
US 2019/0130581 A1  May 2, 2019

Related U.S. Application Data

(63) Continuation of application No. 15/659,655, filed on Jul. 26, 2017, now Pat. No. 10,115,203, which is a continuation of application No. 14/751,196, filed on Jun. 26, 2015, now Pat. No. 9,721,350.

(51) Int. Cl.
| | |
|---|---|
| G06T 7/20 | (2017.01) |
| G06K 9/46 | (2006.01) |
| G06K 9/00 | (2006.01) |
| G06T 7/246 | (2017.01) |
| G06T 7/73 | (2017.01) |

(52) U.S. Cl.
CPC ............ *G06T 7/20* (2013.01); *G06K 9/00335* (2013.01); *G06K 9/00771* (2013.01); *G06K 9/4604* (2013.01); *G06T 7/246* (2017.01); *G06T 7/73* (2017.01); *G06T 2207/30196* (2013.01); *G06T 2207/30232* (2013.01)

(58) Field of Classification Search
None
See application file for complete search history.

(56) References Cited

U.S. PATENT DOCUMENTS

| | | | | |
|---|---|---|---|---|
| 5,929,940 | A * | 7/1999 | Jeannin | H04N 19/543 349/699 |
| 6,041,132 | A * | 3/2000 | Isaacs | G01N 23/046 378/21 |
| 7,783,118 | B2 * | 8/2010 | Zhou | H04N 5/145 348/154 |
| 8,311,277 | B2 * | 11/2012 | Peleg | G11B 27/034 382/103 |
| 8,542,873 | B2 * | 9/2013 | Lien | G06T 7/20 382/103 |
| 9,057,277 | B2 * | 6/2015 | Appleby | B22C 9/22 |
| 2005/0063608 | A1 * | 3/2005 | Clarke | G06T 3/4038 382/284 |

(Continued)

*Primary Examiner* — Tahmina N Ansari
(74) *Attorney, Agent, or Firm* — Vladimir Sherman; Professional Patent Solutions Ltd

(57) ABSTRACT

Disclosed are methods, circuits, devices, systems and associated executable code for multi factor image feature registration and tracking, wherein utilized factors include both static and dynamic parameters within a video feed. Assessed factors may originate from a heterogeneous set of sensors including both video and audio sensors. Acoustically acquired scene information may supplement optically acquired information.

17 Claims, 17 Drawing Sheets

(56) References Cited

U.S. PATENT DOCUMENTS

2008/0228433 A1* 9/2008 Meyer .................... G06T 7/70
  702/150
2013/0158947 A1* 6/2013 Suzuki .................. G01B 11/00
  702/155

* cited by examiner

METHODS CIRCUITS DEVICES SYSTEMS AND ASSOCIATED COMPUTER EXECUTABLE CODE FOR EXTRACTION OF VISIBLE FEATURES PRESENT WITHIN A VIDEO FEED FROM A SCENE

PRIORITY AND CONTINUITY CLAIMS

The present Application is a continuation of U.S. patent application Ser. No. 15/659,655, filed by the inventors of the present invention, titled "Methods Circuits Devices Systems and Associated Computer Executable Code for Extraction of Visible Features Present within a Video Feed from a Scene", filed on Jul. 26, 2017. U.S. patent application Ser. No. 15/659,655, is a continuation of U.S. patent application Ser. No. 14/751,196, filed by the inventors of the present invention, titled "Methods Circuits Devices Systems and Associated Computer Executable Code for Video Feed Processing", filed on Jun. 26, 2015. The aforementioned applications are hereby incorporated herein by reference in their entirety.

FIELD OF THE INVENTION

The present invention generally relates to the fields of computer vision, image and video analysis and scene capture and registration. More specifically, some embodiments relate to methods, circuits, devices, systems and associated executable code for multi factor image feature registration and tracking.

BACKGROUND

Video content analysis (also Video content analytics, VCA) is the capability to automatically analyze video to detect and determine temporal and spatial events. As such, it can be seen as the automated equivalent of the biological visual cortex.

This technical capability is used in a wide range of domains, including entertainment, health-care, retail, automotive, transport, home automation, safety and security. The algorithms can be implemented as software on general purpose machines, or as hardware in specialized video processing units.

Many different functionalities can be implemented in VCA. Video Motion Detection is one of the simpler forms where motion is detected with regard to a fixed background scene.

More advanced functionalities include video tracking and egomotion estimation.

Based on the internal representation that VCA generates in the machine, it is possible to build other functionalities, such as identification, behavior analysis or other forms of situation awareness.

VCA relies on good input video, so it is often combined with video enhancement technologies such as video denoising, image stabilization, unsharp masking and super-resolution.

Still, there remains a need, in the fields of computer vision, image and video analysis, and scene capture and registration, for technologies that may utilize multi factor image feature registration and tracking, including both static and dynamic parameters within a video feed, and optionally acoustically acquired scene information.

SUMMARY OF THE INVENTION

The present invention includes methods, circuits, devices, systems and associated executable code for multi factor image feature registration and tracking, wherein utilized factors include both static and dynamic parameters within a video feed. According to some embodiments, assessed factors may originate from a heterogeneous set of sensors including both video and audio sensors. According to yet further embodiments, acoustically acquired scene information may supplement optically acquired information.

A 'video feed', in accordance with embodiments of the present invention, may relate to any live or real-time video streaming, a pre-recorded video feed, and/or to any set of consecutive still images.

According to some embodiments of the present invention, a system for multi factor image feature registration and tracking may comprise: (1) a Camera Type Identification Module for identifying whether the source of a received video feed is a static or a dynamic camera; (2) a Lens Distortion Compensation Module for digitally correcting video feed image distortion; (3) a Camera Position Module for identifying the position and orientation of the camera within a scene; (4) a 3-dimensional (hereinafter: 3D) Trajectory Tracking Module for assigning orientation vectors to dynamic element(s) in the scene and/or to the scene camera; (5) a Dynamic Element Analysis Module for identifying and tracking dynamic elements within the scene; (6) a Static Scene Features Registration Module for registering static elements in the scene, based on the motion of the tracked dynamic element(s) and/or based on interactions between the tracked dynamic element(s) and the static elements in the scene and/or for building a relative depth scene based on the registration of images in the scene; and/or (7) a Behavior Correlation Module for correlating detected/measured/extracted motion dynamics of the dynamic element(s) in the scene to characterized actions and/or for recognizing specific human individuals based on their motion dynamic characteristics data/profile/records.

According to some embodiments, the system may further comprise: (8) an Acoustic Scene Mapping Module for utilizing scattered acoustic splash-back to further map the scene.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
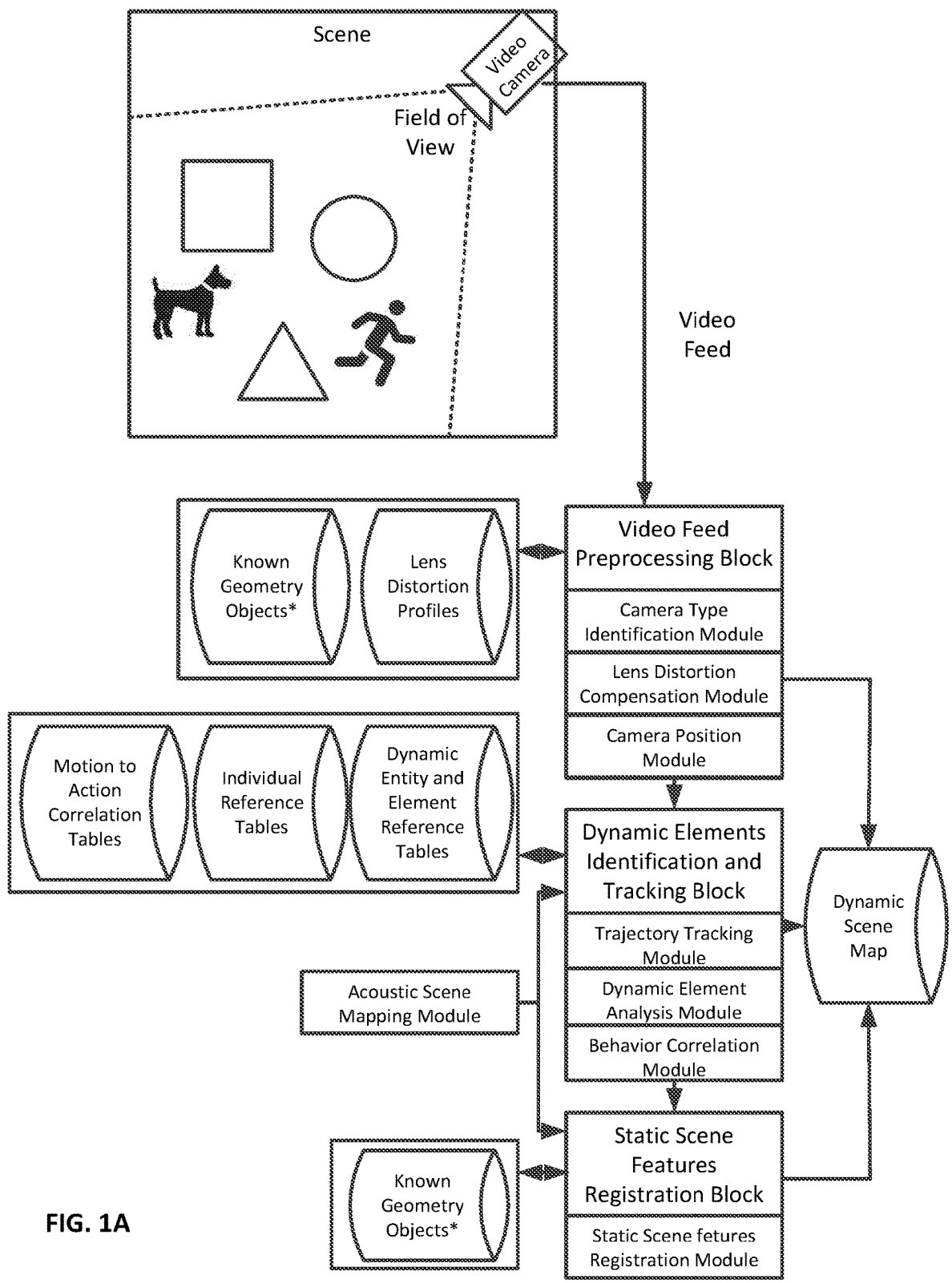
FIG. 1A shows a high level illustration of an exemplary scene capture and characterization system, in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Unless specifically stated otherwise, as apparent from the following discussions, it is appreciated that throughout the specification discussions utilizing terms such as "processing", "computing", "calculating", "determining", or the like, may refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In addition, throughout the specification discussions utilizing terms such as "storing", "hosting", "caching", "saving", or the like, may refer to the action and/or processes of 'writing' and 'keeping' digital information on a computer or computing system, or similar electronic computing device, and may be interchangeably used. The term "plurality" may be used throughout the specification to describe two or more components, devices, elements, parameters and the like.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

The present invention includes methods, circuits, devices, systems and associated executable code for Multi factor image feature registration and tracking, wherein utilized factors include both static and dynamic parameters within a video feed. According to some embodiments, assessed factors may originate from a heterogeneous set of sensors including both video and audio sensors. According to yet further embodiments, acoustically acquired scene information may supplement optically acquired information.

A 'video feed', in accordance with embodiments of the present invention, may relate to any live or real-time video streaming, a pre-recorded video feed, and/or to any set of consecutive still images.

According to some embodiments of the present invention, a system for multi factor image feature registration and tracking may comprise: (1) a Camera Type Identification Module for identifying whether the source of a received video feed is a static or a dynamic camera; (2) a Lens Distortion Compensation Module for digitally correcting video feed image distortion; (3) a Camera Position Module for identifying the position and orientation of the camera within a scene; (4) a 3-dimensional (hereinafter: 3D) Trajectory Tracking Module for assigning orientation vectors to dynamic element(s) in the scene and/or to the scene camera; (5) a Dynamic Element Analysis Module for identifying and tracking dynamic elements within the scene; (6) a Static Scene Features Registration Module for registering static elements in the scene based on the motion of the tracked dynamic element(s) and/or based on interactions between the tracked dynamic element(s) and the static elements in the scene and/or for building a relative depth scene based on the registration of images in the scene; and/or (7) a Behavior Correlation Module for correlating detected/measured/extracted motion dynamics of the dynamic element(s) in the scene to characterized actions, and/or for recognizing specific human individuals based on their motion dynamic characteristics data/profile/records. According to some embodiments, the system may further comprise: (8) an Acoustic Scene Mapping Module for utilizing scattered acoustic splash-back to further map the scene.

According to some embodiments of the present invention the Camera Type Identification Module may: (1) extract dynamic and static image edges along two or more frames of the video feed; (2) register a group of static edges in the scene that are repetitively identified ('survive') along several consecutive frames and wherein the static edges' positions relative to each other do not change over some period of time/frames; and/or (3) determine that the camera is static if the group of extracted edges substantially align along consecutive frames, or that the camera is dynamic if the extracted edges show substantially inconsistent alignment along consecutive frames.

According to some embodiments of the present invention, the Lens Distortion Compensation Module, when the lens distortion parameters are known, may: (1) reference a known or estimated distortion profile/model/function—of the camera's lens and/or of other optical features (e.g. mirrors) along the optical pass of the camera; and/or (2) digitally introduce an inverse distortion function/shift per image pixel or group of pixel to compensate for the distortion.

According to some embodiments, the Lens Distortion Compensation Module, when the lens distortion parameters are unknown, may use known background edges along images to calculate distortion. In the case of a static camera the Lens Distortion Compensation Module may: (1) use the deformation of dynamic elements that cross the frame; and/or (2) identify geometries the scene background and compare them to expected geometries based on the location in the image (center/sides)—to generate an estimated distortion profile. In the case of a dynamic camera the Lens Distortion Compensation Module may use edges in the scene that deform along the 3D movement of the camera to generate the estimated distortion profile.

According to some embodiments of the present invention, the Camera Position Module may identify the position/orientation of the camera by correlating the appearance of known background geometries and/or orientation to an estimated 3D projection of the 'scene's floor', and/or other scene background planes. According to some embodiments, for dynamic objects and/or elements, the Camera Position Module may compute and track the trajectory of the dynamic objects/elements by comparing the change in appearance (e.g. size & location) as a function of displacement (e.g. movement in a given direction) over multiple frames of the video feed.

According to some embodiments, for a static camera, the assumed scene floor may be registered in accordance with straight background scene edges and aligned with the computed movement trajectories of the dynamic objects/elements. According to some embodiments, for a static camera, building a relative depth scene, or relative camera Field Of View (FOV) 3D scene model, based on the registration of images in the scene may include: (1) registering scene floor, and/or other scene planes, in accordance with straight background scene edges; (2) correlating the appearance of objects having a known geometry and/or orientation to a 2-dimensional (2D) projection(s) of the known geometry; (3) comparing the relative sizes in FOV frame to: known geometry objects, dynamic elements/objects/entities in scene, possibly as a function of their displacement (e.g. movement/shift in a given direction over floor); and/or (4) repeating 1-3 for at least some of the following frames and/or possibly comparing to prior frame(s) results and tuning accordingly (e.g. averaging).

According to some embodiments, for a dynamic/moving camera, the Camera Position Module may calculate 2D projection(s), of straight edges in the scene background found in X, Y, and Z, to find the floor's 3D orientation. According to some embodiments, for a dynamic/moving camera, building a relative depth scene, or relative camera Field Of View (FOV) 3D scene model, based on the registration of images in the scene may include: (1) registering scene floor, and/or other scene planes, in accordance with straight background scene edges; (2) correlating the appearance of objects having a known geometry and/or orientation to a 2D projection(s) of the known geometry; (3) comparing the relative sizes in FOV frame to: known geometry objects, dynamic elements/objects/entities in scene, possibly as a function of their displacement (e.g. movement/shift in a given direction over floor); and/or (4) repeating 1-3 for at least some of the following frames, while performing triangulations between multiple following/consecutive video feed frames for further estimating/determining the positions of static/background scene elements/features and/or sections thereof—based on their prior frame(s) positions and the current known positioning and/or orientation of the dynamic camera, and/or possibly comparing to prior frame(s) results and tuning accordingly (e.g. averaging).

According to some embodiments, the scene background 3D edge transformation may be calculated for a single frame, out of each set of frames including a certain number of consecutive frames. Calculating the scene background 3D edge transformation for sets including a smaller number of frames (e.g. every 5$^{th}$ frame rather than every 10$^{th}$ frame), or for every single frame, may be utilized to improve the results of the transformation.

According to some embodiments of the present invention, the 3D Trajectory Tracking Module may utilize 3D trajectory tracking of dynamic elements in the video feed to assign them with orientation vectors. According to some embodiments, assigned orientation vectors may assist in later analysis of dynamic elements as part of their identification. Aligning the position of a given dynamic element to the 3D scene may provide the 3D position and movement direction of the dynamic element in every frame.

According to some embodiments, based on the direction of movement/progress of the dynamic element, certain parts of the dynamic elements, and/or its 'owning' entity (e.g. human, dog), may be expected to show in the frame (e.g. face the camera) and thus the tracking and identification of the dynamic element and/or its 'owning' entity may be improved (e.g. if the face of a human entity is expected a face detection recognition algorithm/system may be triggered/operated accordingly; and/or its regular operation, or the operation of other human analysis/recognition algorithms/functionalities, may be accordingly changed).

According to some embodiments of the present invention, the Dynamic Element Analysis Module may: (1) detect dynamic edges that may not be associated with background edges identified in the scene; (2) group dynamic edge vectors (e.g. edge vectors which move together); (3) measure relative motion dynamics between edge vectors of a (linked) group of dynamic edge vectors; (4) compare dynamic edge vector motion dynamics of the (linked) group of dynamic edge vectors to dynamic element reference tables, as units and/or as chains; (5) identify the dynamic element of the (linked) group of dynamic edge vectors (e.g. human arm, human leg, dog leg); (6) identify the entity to which the dynamic element belongs according to entity reference tables (e.g. human, dog, car, horse) and/or, if the entity is identified as human or other recognizable entity type, recognize the specific individual/specimen to which the dynamic element belongs according to individual reference tables; (7) identify the orientation of the entity/individual within the video feed frame; and/or (8) generate tracking optimization parameters based on the identified orientation of the identified entity.

According to some embodiments of the present invention, the Static Scene Features Registration Module, as part of characterizing the parameters of static scene elements, may: (1) track the motion of the dynamic element(s) in the scene; (2) identify reoccurring geometrical shapes/forms/paths associated with the motions of each of the dynamic elements tracked in the scene; and (3) infer the general shapes and positions of static elements in the scene. According to some embodiments, inferred shapes and positions of static elements may be registered to a 3D modeling of the static scene, and/or registered as part of a dynamic scene map.

According to some embodiments, the Static Scene Features Registration Module, as part of identifying the boundaries of static scene elements, may: (1) track the motion of the dynamic element(s) in the scene; (2) identify reoccurring interactions and/or intersections of the dynamic elements tracked in the scene with static elements (e.g. of known shapes/positions, inferred as part of characterizing the parameters of static scene elements); and (3) infer the boundaries/borders of static elements in the scene. According to some embodiments, inferred boundaries/borders of static elements may be registered to a 3D modeling of the static scene, and/or registered as part of a dynamic scene map.

According to some embodiments, the Static Scene Features Registration Module, as part of estimating the dimensions of static scene elements, may: (1) track the motion of the dynamic element(s) in the scene; (2) identify the relative positions of the tracked dynamic elements in relation to the static elements (e.g. of known shapes/positions/boundaries, inferred as part of characterizing the parameters of static scene elements and/or identifying the boundaries of static scene elements); and (3) infer the dimensions/sizes of the static elements in the scene in relation to the dimensions/sizes of the tracked dynamic elements.

According to some embodiments, one or more known/calculated/estimated actual dimensions of one or more of the dynamic elements in the scene (e.g. derived based on the individual identification of the dynamic entity to which the dynamic element belongs—as further described hereinafter) may be used to calculate/estimate dimensions of static elements in the scene at least partially based on the inferred dimensions/sizes ratio—and vice versa (known static elements dimensions used to find sizes of dynamic elements). According to some embodiments, inferred dimensions/sizes of static elements may be registered to a 3D modeling of the static scene, and/or registered as part of a dynamic scene map.

According to some embodiments, interactions and/or intersections of the dynamic elements tracked in the scene with static elements may include any type of visible/identifiable contact or appeared contact, multiple visible contacts or appeared contacts, and/or delayed or prolonged contact or appeared contact—between dynamic element(s) in the scene and a suspected static element.

For example: more than two static halts/rests of the edge of a dynamic element, and/or the edge of part thereof, along the same straight line may indicate an edge or boundary of a static element; more than three static halts/rests of the edge of a dynamic element, and/or the edge of part thereof, across the same plane may indicate a surface boundary of a static element; multiple static halts/rests of the edge of a dynamic element, and/or the edge of part thereof, across the same plane may 'color' the plane of a static element (e.g. an object in the scene) with dynamic element 'contact' points, thus defining its shape (e.g. area covered with contact spots) and edges (e.g. boundary between contact spots covered area and the rest of the associated plane).

According to some embodiments, the Static Scene Features Registration Module may reference a 'known geometry objects' table or database and retrieve geometrical data that may be relevant to characterizing the parameters, identifying the boundaries, and/or estimating the dimensions, of static elements partially identified (e.g. to enable referencing) in the scene.

According to some embodiments of the present invention, the Behavior Correlation Module, as part of recognizing an identified entity type, may: (1) build a profile for at least some of the dynamic elements based on the consolidation of the entity-type/individual motion dynamics of the tracked element(s) and its biometric features (e.g. size, dimensions); and/or (2) compare a profile of a tracked dynamic edge vector motion dynamics, and its biometric features, to Individual Reference Tables (other profiles), pre-defined in the system data base, or, assign a new identity reference table (new profile).

According to some embodiments, the Behavior Correlation Module, as part of recognizing a specific behavior, and based on the identified entity type (e.g. dog, human) may: (1) select a table to correlate the measured motion dynamics to a characterized action (e.g. person walking, person falling, dog jumping); and (2) correlate the measured motion dynamics of the tracked dynamic element with entries in the selected table, correlating measured motion dynamics to a characterized action of the identified entity.

According to some embodiments of the present invention, the Acoustic Scene Mapping Module, as part of actively mapping/profiling a static scene and assigning 3D depth values to static elements within the scene, may use acoustic backsplash generated by the camera's speaker/s and captured by the camera's microphone to assign the estimated distances and dimensions of scattered elements in the acquired scene, while assigning real world depth values to the scene's respective 3D map. According to some embodiments, acoustic backsplash based scene element(s) distances from the camera may be allocated to elements visible within scene images of the video feed.

According to some embodiments, the acoustic scene mapping process may require a channel sounding between speaker and mic process as a pre calibration phase, for specific cameras. According to some embodiments, the use of stereo speakers may be utilized as a triangulation means enabling a substantially exact positioning of elements in the scene.

According to some embodiments, dynamic objects/elements/entities passing through the scene may trigger the remapping of the scene, wherein the static scene depth map is subtracted from the remapped scene to extract dynamic object/element/entity depth values, assigned to a dynamic object on the image plane.

According to some embodiments, as part of a passive event detection process, the Acoustic Scene Mapping Module may: (1) monitor the scene's audio for acoustic bursts indicating an event; (2) analyze the corresponding video feed section for a visual indication of the event source; and/or (3) calculate the time difference between the visual event indication and the its acoustic microphone pickup instance, which time difference is indicative of the distance traveled by the acoustic burst from the location of the event within the scene to the camera's microphone.

According to some embodiments of the present invention, known 3D scene features, along with image processing datasets sampled along consecutive frames of the video feed (e.g. color, texture, known shapes, logos, known scenes) may be utilized to estimate scene contexts and may be used to optimize the system's context and feature extraction capabilities, from the video feed. For example, based on the cross-correlation of static and dynamic data sets, scene contexts may be estimated. Such exemplary cross-correlations may include, but are not limited to: moving water+sand=beach; green grass+trees=park; statue of liberty=NYC; and the like.

In FIG. 1A there is shown a high level illustration of an exemplary scene capture and characterization system, in accordance with some embodiments of the present invention. A video camera feed from a scene is compensated for lens and optical equipment distortions based on the reference of lens distortion profiles (e.g. distortion matrix) and/or identification of objects of known geometry distorted over multiple video feed images/frames. The video feed is analyzed for the identification and tracking of dynamic elements. Identified dynamic elements are characterized based on the reference of known dynamic elements, entities, individuals, and motions. The identification of the dynamic elements is supplemented based on the registration of static scene features, possibly of know object geometry, to assist the tracking of the dynamic elements based on interactions in the scene between dynamic elements and registered static objects. Compensated data, analysis data and supplemented 'static' data are utilized for the construction of a dynamic scene map.

Figure 1B:
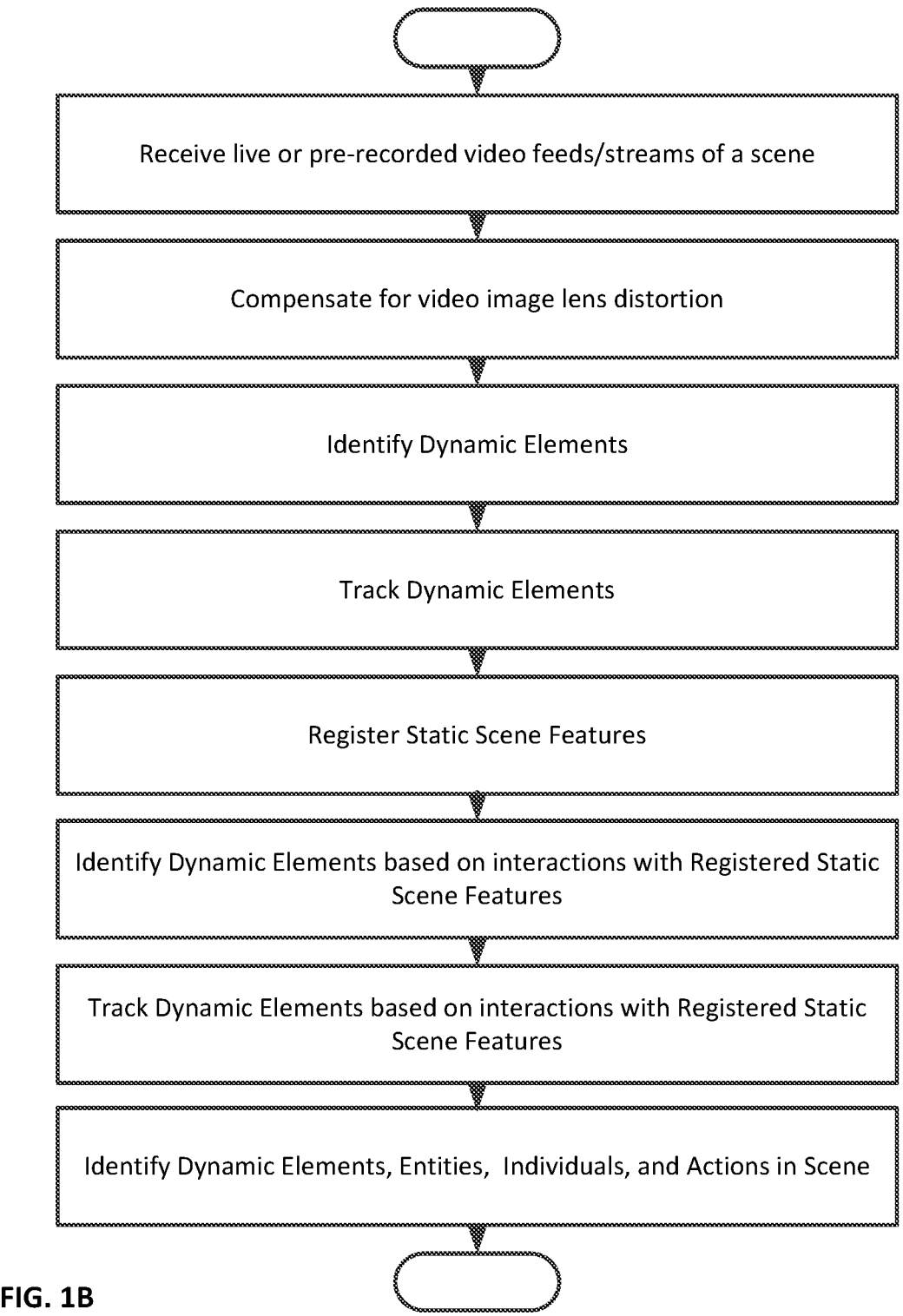
FIG. 1B is a flowchart of the main steps executed by an exemplary scene capture and characterization system, in accordance with embodiments of the present invention.

In FIG. 1B there is shown a flowchart of the main steps executed by an exemplary scene capture and characterization system, in accordance with embodiments of the present invention.

Figure 2A:
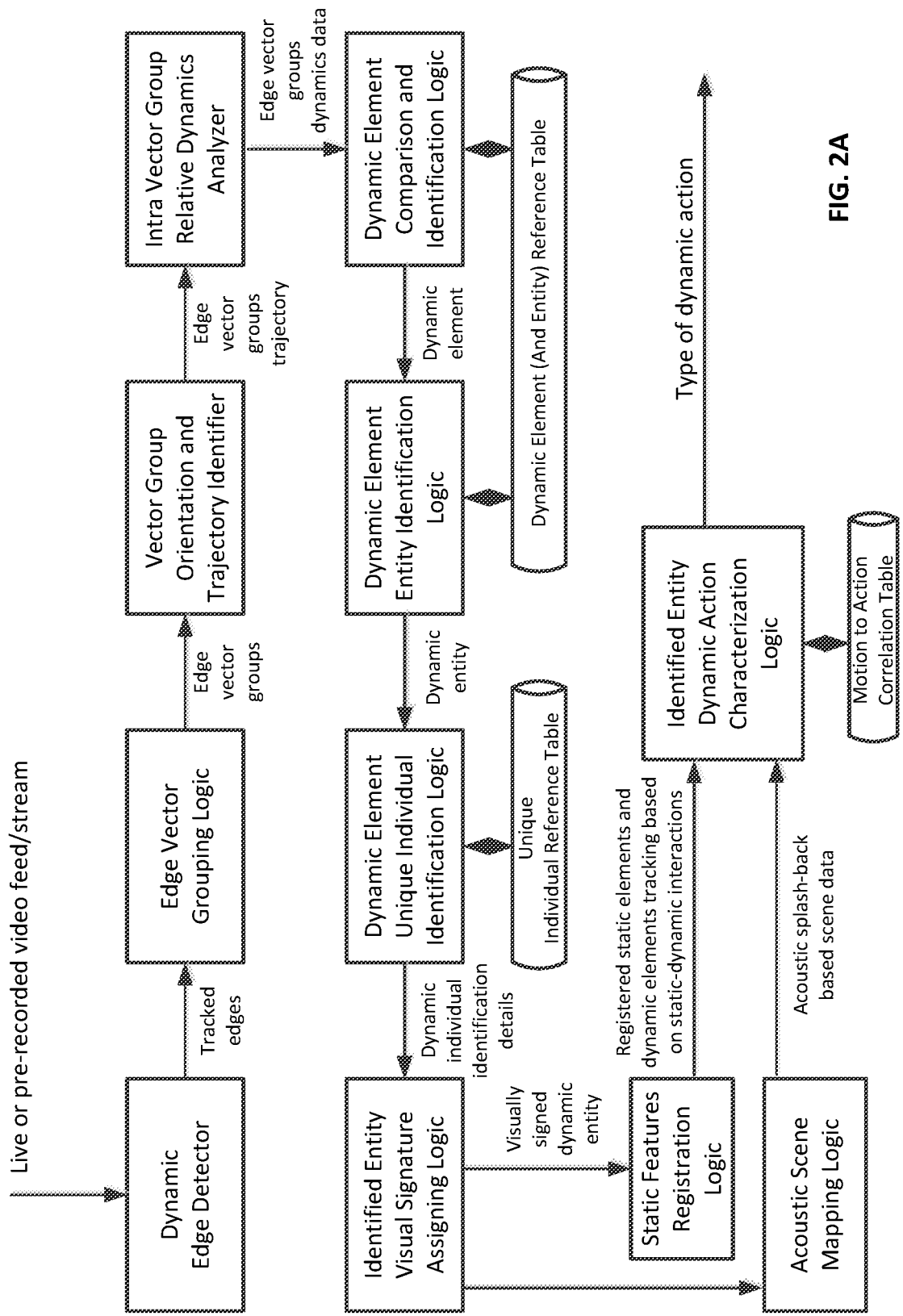
FIG. 2A shows a functional block diagram of an exemplary video feed or video stream processing engine adapted to characterize and optionally meta-tag a video feed/stream, in accordance with embodiments of the present invention.
Figure 2B:
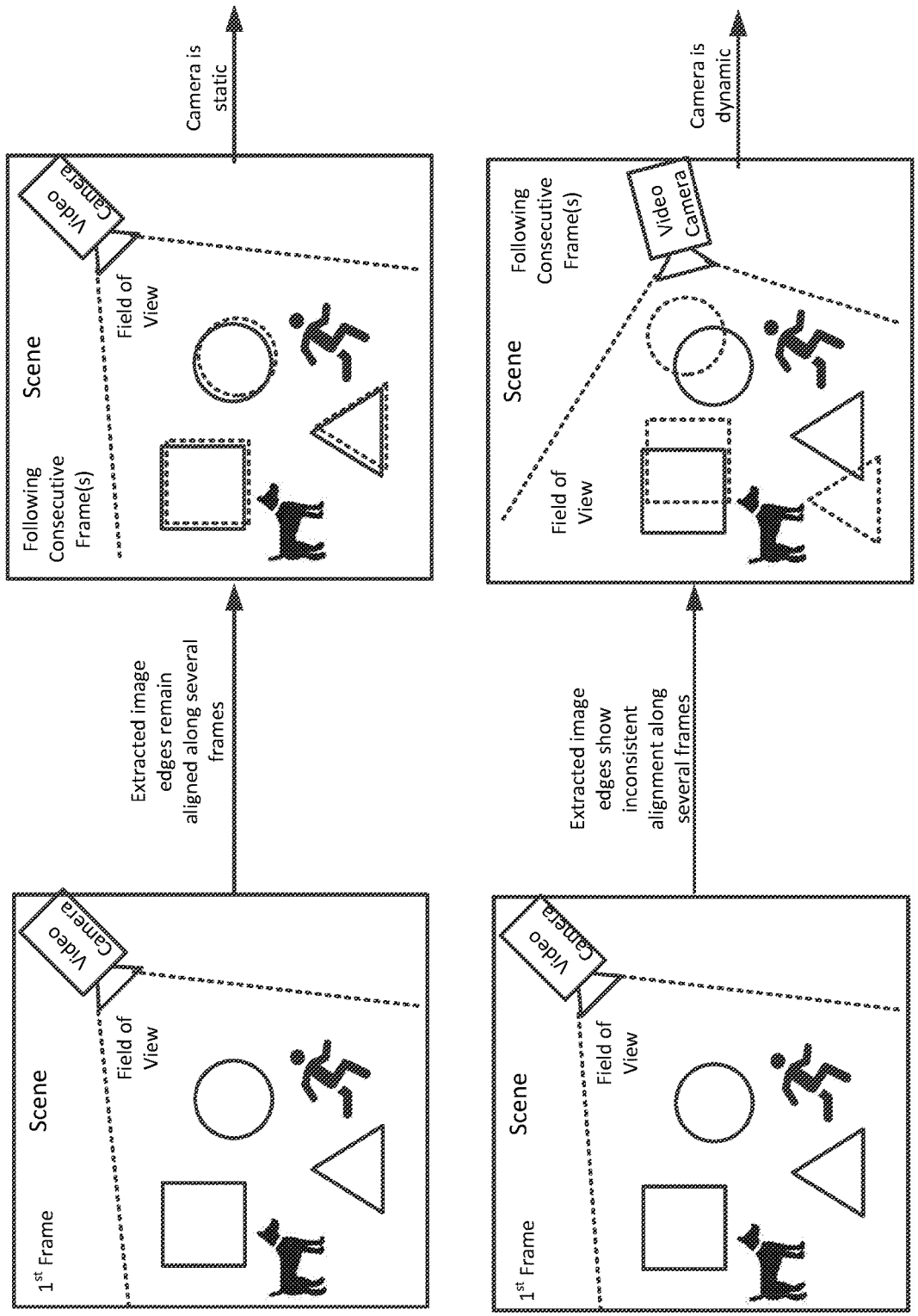
FIGS. 2B-2G show diagrams exemplifying the main steps executed by an exemplary video feed or video stream processing engine adapted to characterize and optionally meta-tag a video feed/stream, in accordance with embodiments of the present invention.
Figure 2C:
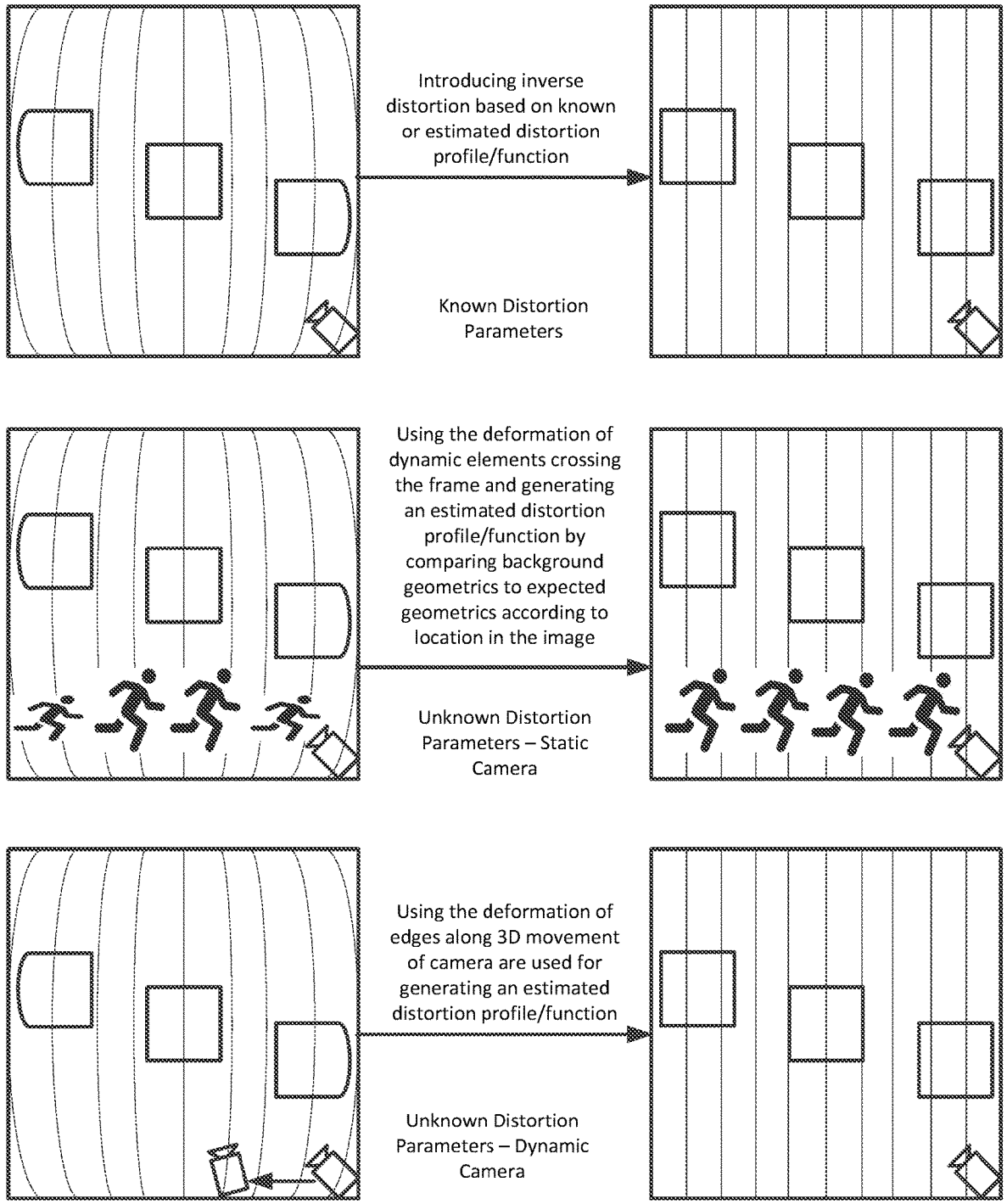
Figure 2D:
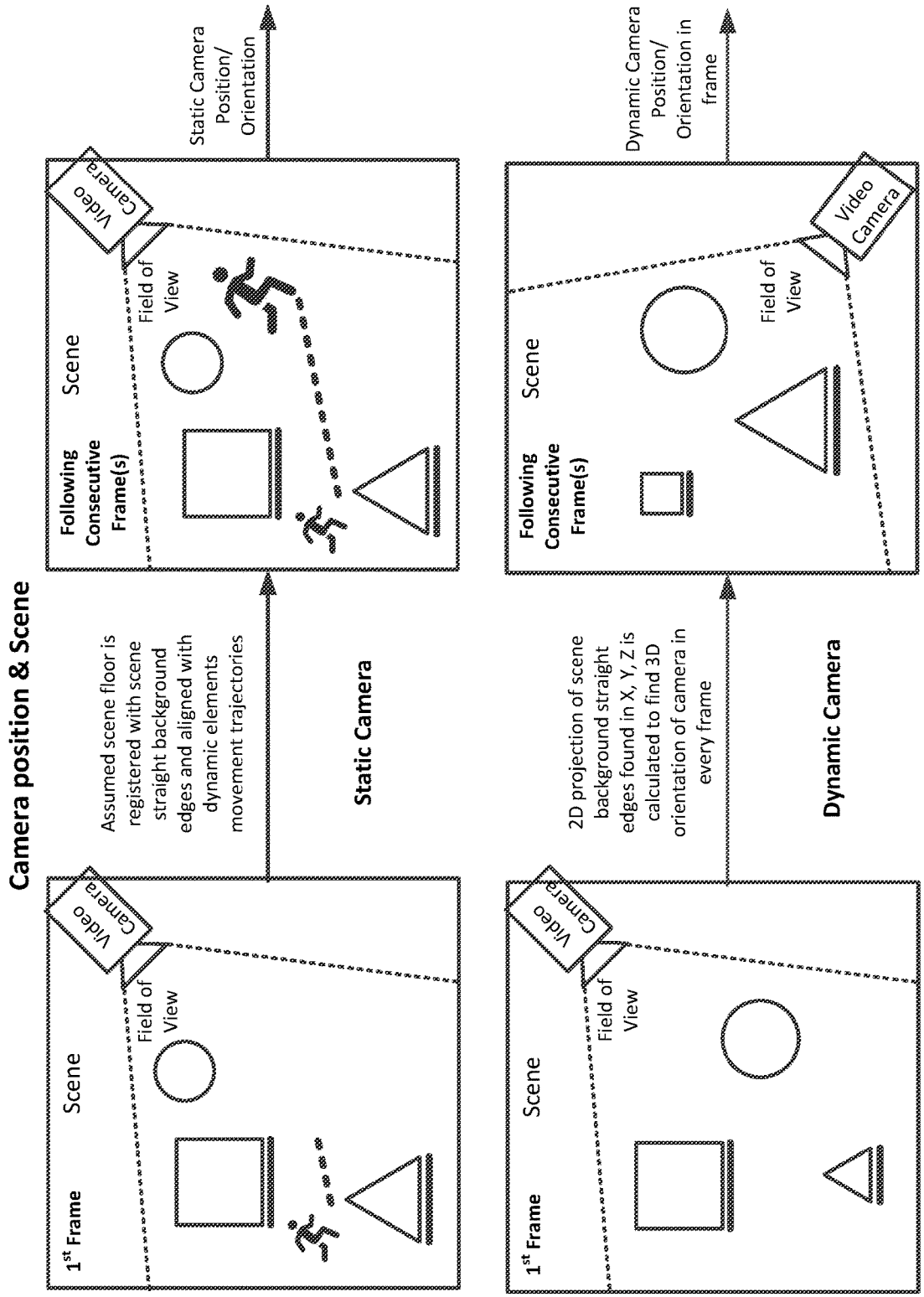
Figure 2E:
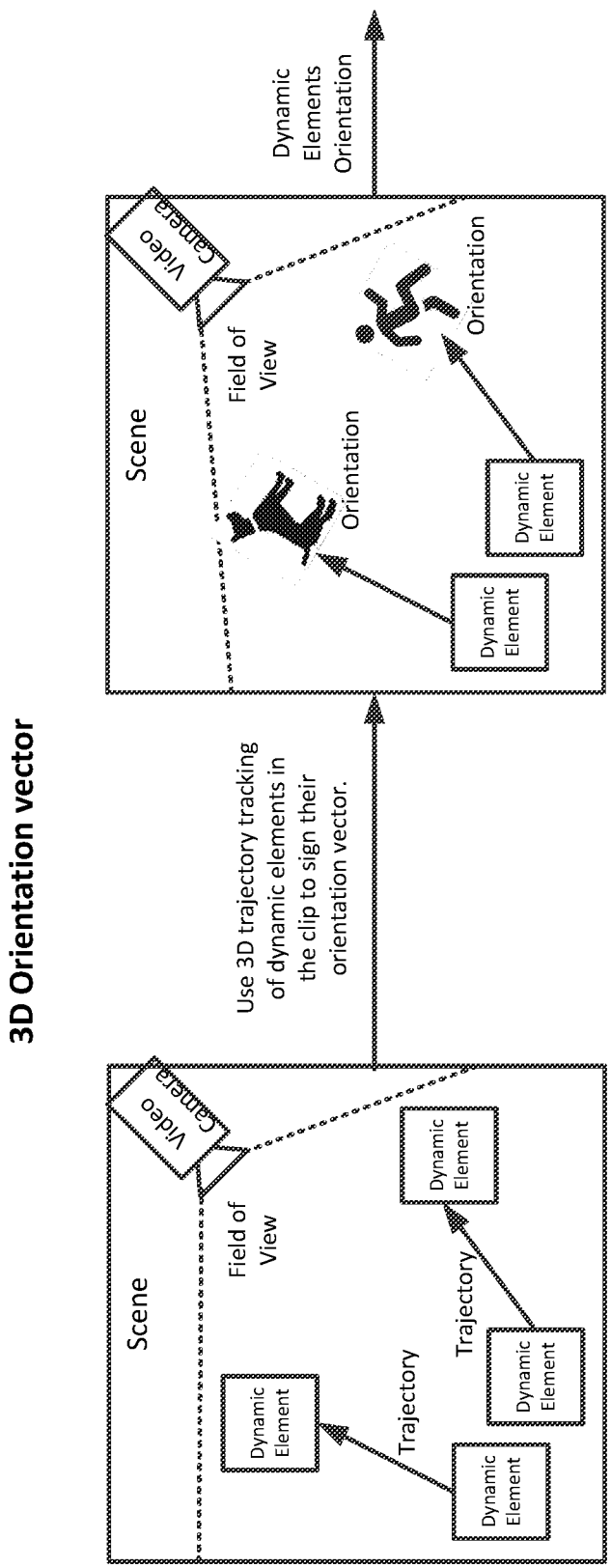
Figure 2F:
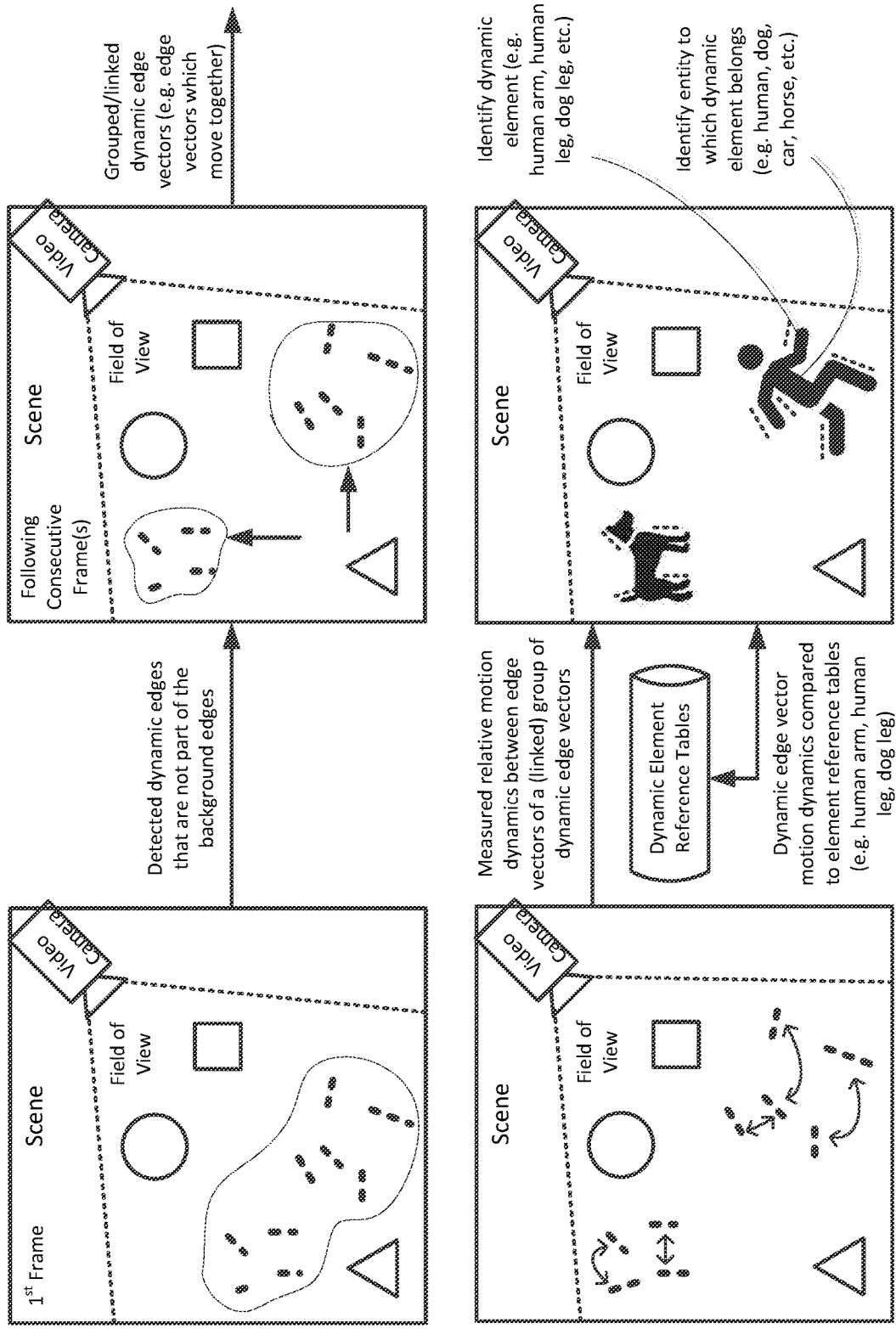
Figure 2G:
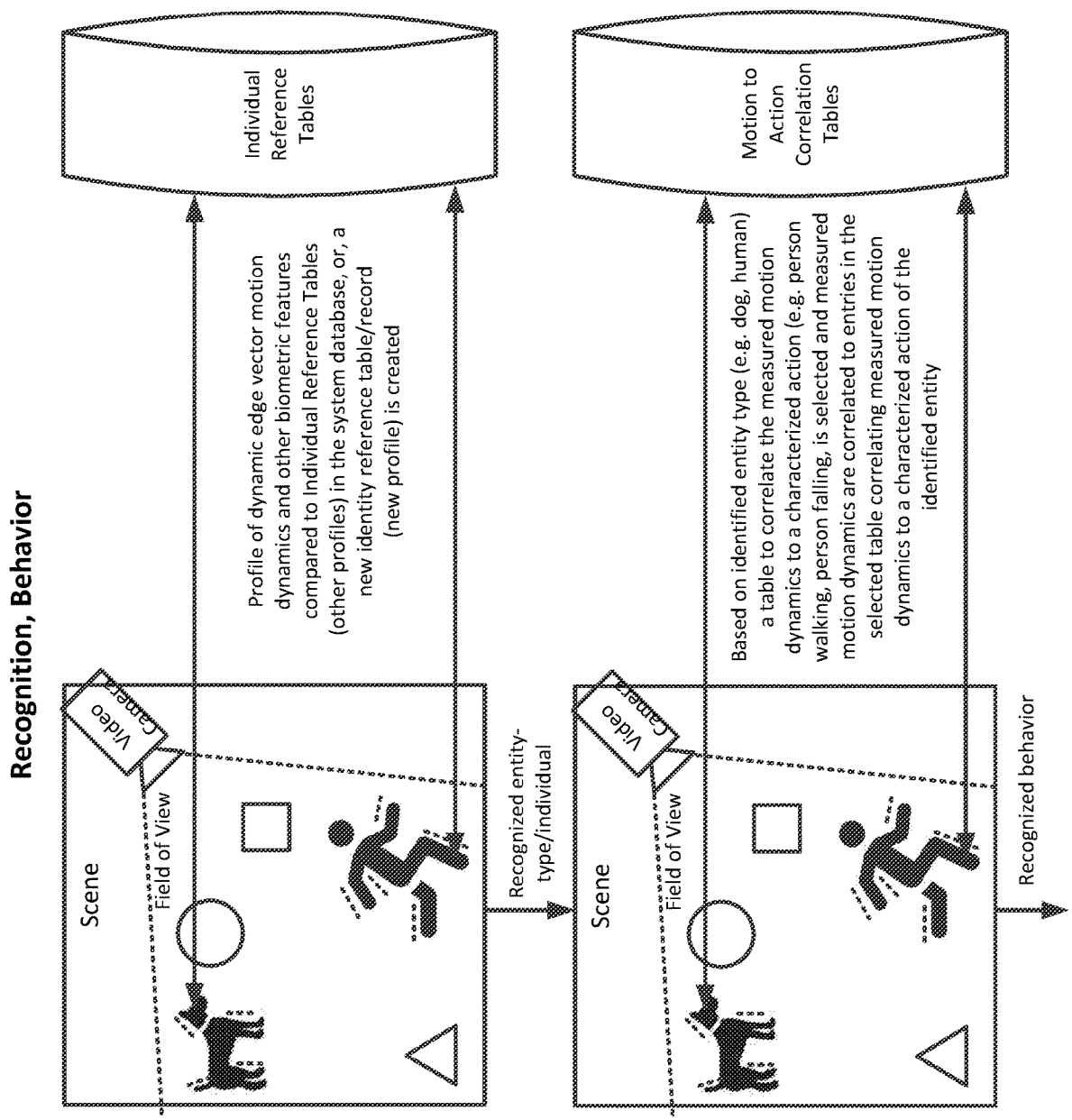

In FIG. 2A there is shown a functional block diagram of an exemplary video feed or video stream processing engine adapted to characterize and optionally meta-tag a video feed/stream, in accordance with embodiments of the present invention. Live or pre-recorded video feed/stream is received by the processing engine. A Dynamic Edge Detector identifies and tracks dynamic edges in the video feed. An Edge Vector Grouping Logic groups the identified edge vectors. A Vector Group Orientation and Trajectory Identifier finds the trajectory and orientation of the edge vector groups in the scene. An Intra Vector Group Relative Dynamics Analyzer extracts edge vector groups' dynamics data. A Dynamic Element Comparison and Identification Logic references a Dynamic Element Reference Table for finding the types of dynamic elements identified in the scene. A Dynamic Element Entity Identification Logic references a Dynamic Entity Reference Table for finding the type of dynamic entities identified in the scene. A Dynamic Element Unique Individual Identification Logic references a Unique Individual Reference Table for finding the individual details of similar entities identified in the scene. An Identified Entity Visual Signature Assigning Logic visually signs dynamic entities in the scene for improved tracking.

And, an Identified Entity Dynamic Action Characterization Logic references a Motion to Action Correlation Table for finding the type of dynamic actions performed in the scene.

In FIGS. 2B-2G there are shown diagrams exemplifying the main steps executed by an exemplary video feed or video stream processing engine adapted to characterize and optionally meta-tag a video feed/stream, in accordance with embodiments of the present invention. The exemplified steps shown include: a static/dynamic camera type decision process (2B); a lens distortion compensation process (2C); a camera positioning within scene process (2D); a dynamic entity 3D orientation and trajectory vectors estimation process (2E); a dynamic element identification and tracking process (2F); and a dynamic entity recognition and behavior analysis process (2G).

Figure 3A:
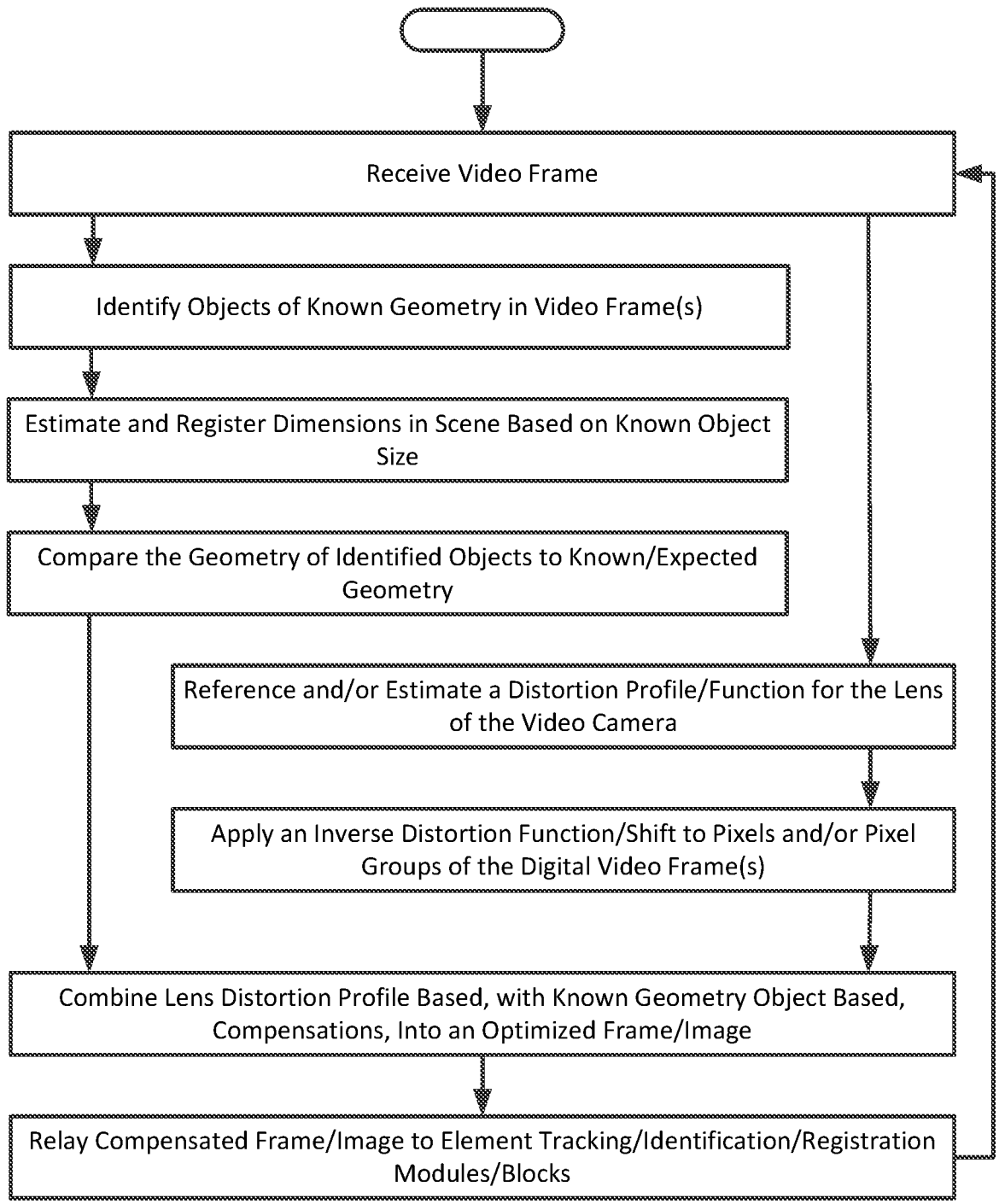
FIG. 3A is a flowchart of the main steps of an exemplary imaging path (lens or other elements) distortion compensation method, in accordance with embodiments of the present invention.

In FIG. 3A there is shown a flowchart of the main steps of an exemplary imaging path (lens or other elements) distortion compensation method, in accordance with embodiments of the present invention.

Figure 3B:
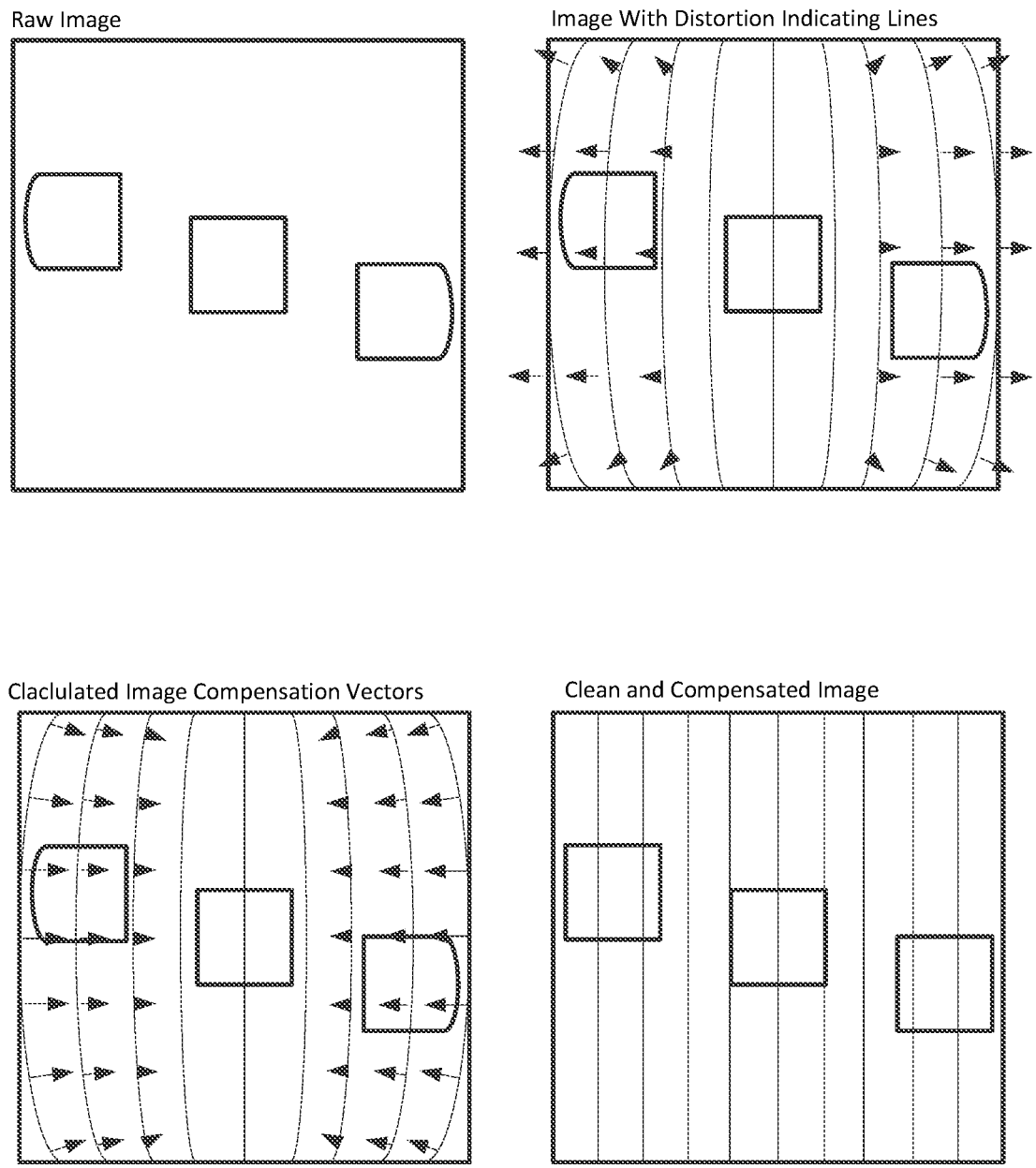
FIG. 3B shows exemplary effects of the exemplary distortion compensation method, including: raw image, image with lines indicating distortion bending vector in regions, calculated inverse bending vectors to compensate, and clean and compensated image, in accordance with embodiments of the present invention.

In FIG. 3B there are shown the effects of the exemplary distortion compensation method, including schematic illustrations of: a raw image; an image with lines indicating distortion bending vectors in different regions; a set of calculated inverse bending vectors to compensate for the distortion; and a clean and compensated image.

Figure 4:
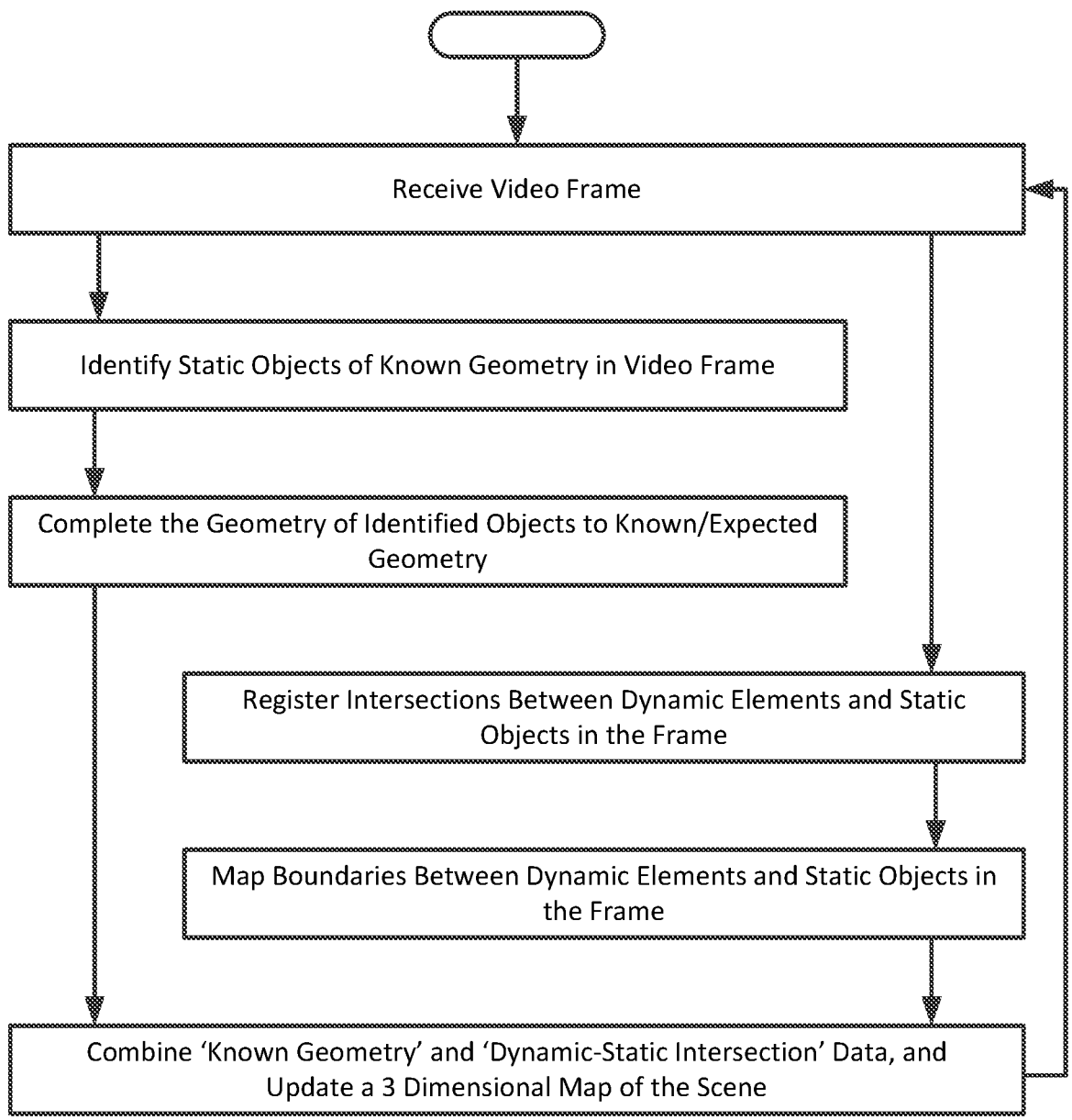
FIG. 4 is a flowchart of the main steps of an exemplary static scene element (i.e. background) registration method, including: following straight lines, checking intersections with dynamic elements, and iteratively completing a 3D map from multiple images at different perspectives, in accordance with embodiments of the present invention.

In FIG. 4 there is shown a flowchart of the main steps of an exemplary static scene element (i.e. background) registration method, including: following straight lines, checking intersections with dynamic elements, and iteratively completing a 3D map from multiple images at different perspectives, in accordance with embodiments of the present invention.

Figure 5:
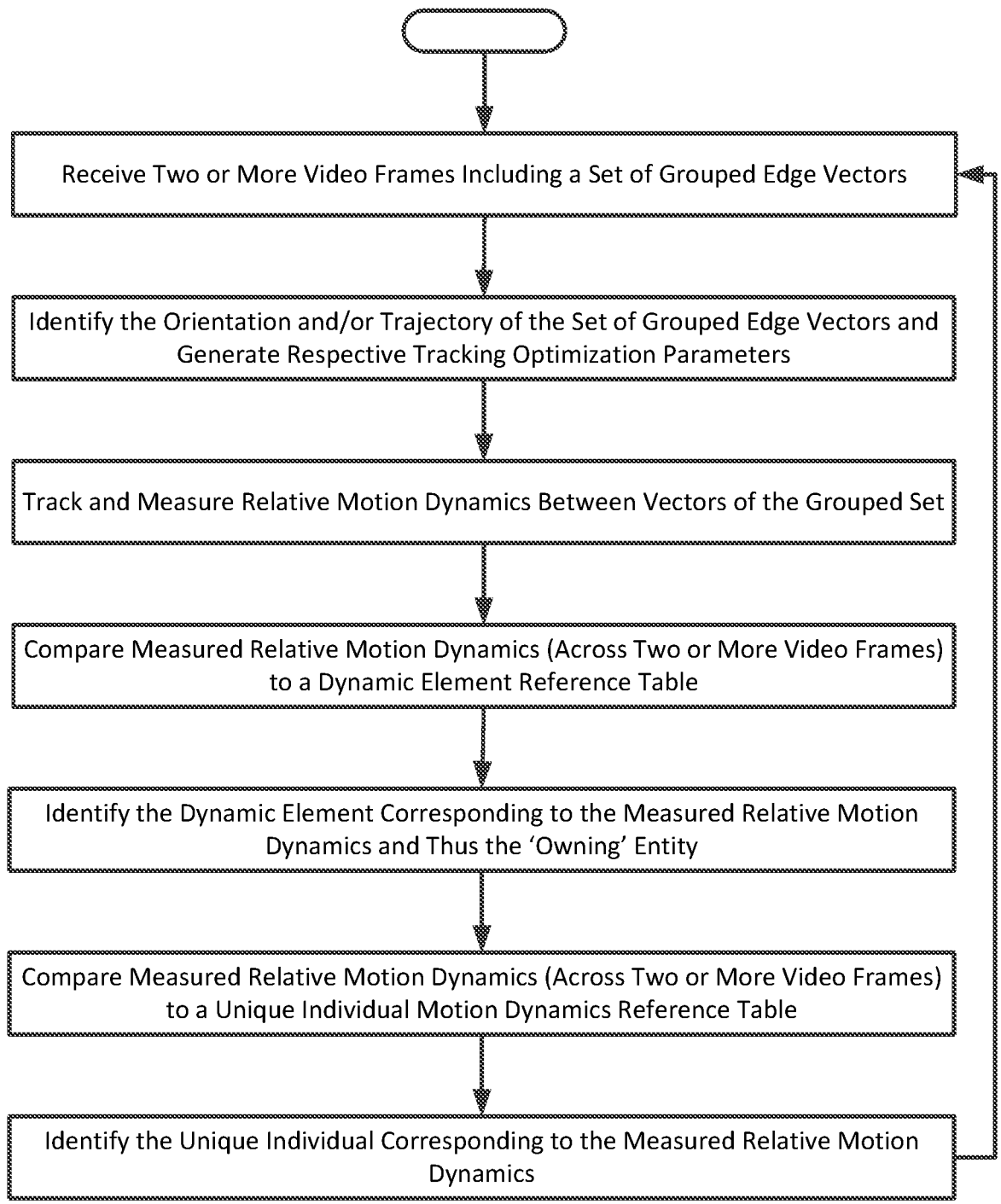
FIG. 5 is a flowchart of the main steps of an exemplary dynamic elements detection and tracking method within a video feed of a scene, and the identification of the entity types and individuals to which the dynamic elements belong, in accordance with embodiments of the present invention.

In FIG. 5 there is shown a flowchart of the main steps of an exemplary dynamic elements detection and tracking method within a video feed of a scene, and the identification of the entity types and individuals to which the dynamic elements belong, in accordance with embodiments of the present invention.

Figure 6:
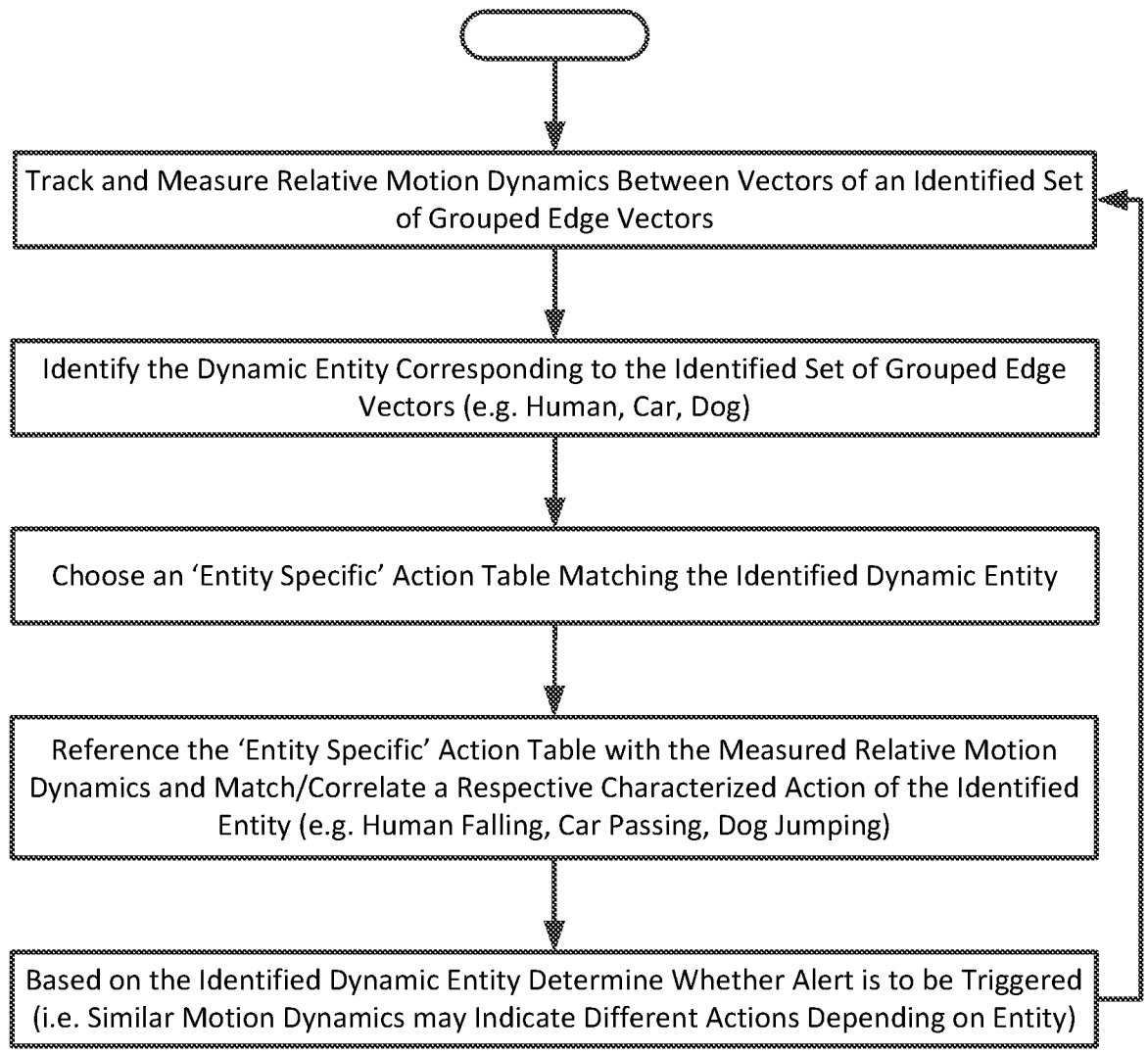
FIG. 6 is a flowchart of the main steps of an exemplary motion characterization method, including the choosing/selection of an entity specific motion to action table, in accordance with embodiments of the present invention.

In FIG. 6 there is shown a flowchart of the main steps of an exemplary motion characterization method, including the choosing/selection of an entity specific motion to action table, in accordance with embodiments of the present invention.

Figure 7A:
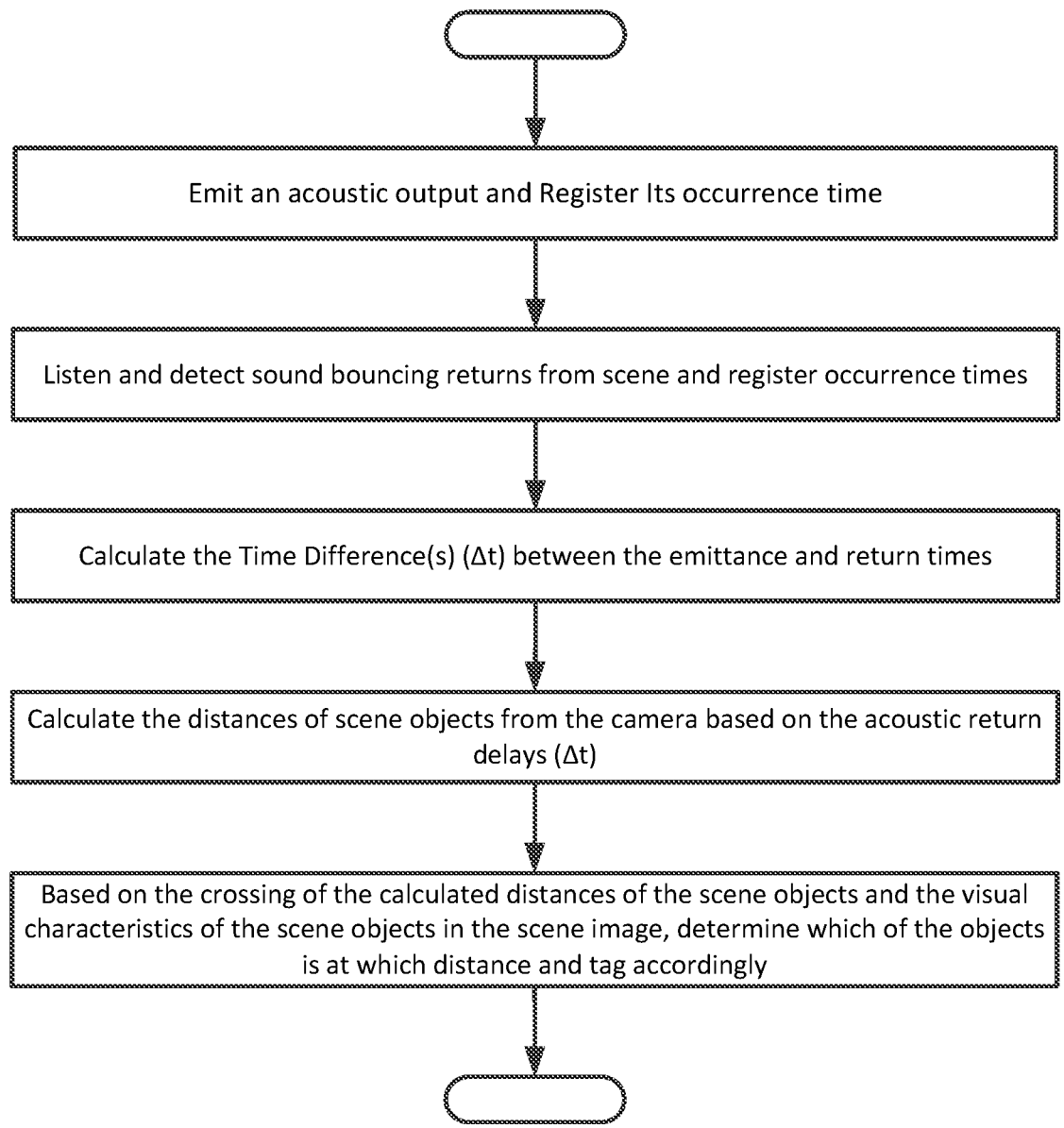
FIG. 7A is a flowchart of the main steps of an exemplary acoustic splash back method, in accordance with embodiments of the present invention.

In FIG. 7A there is shown a flowchart of the main steps of an exemplary acoustic splash back method, in accordance with embodiments of the present invention.

Figure 7B:
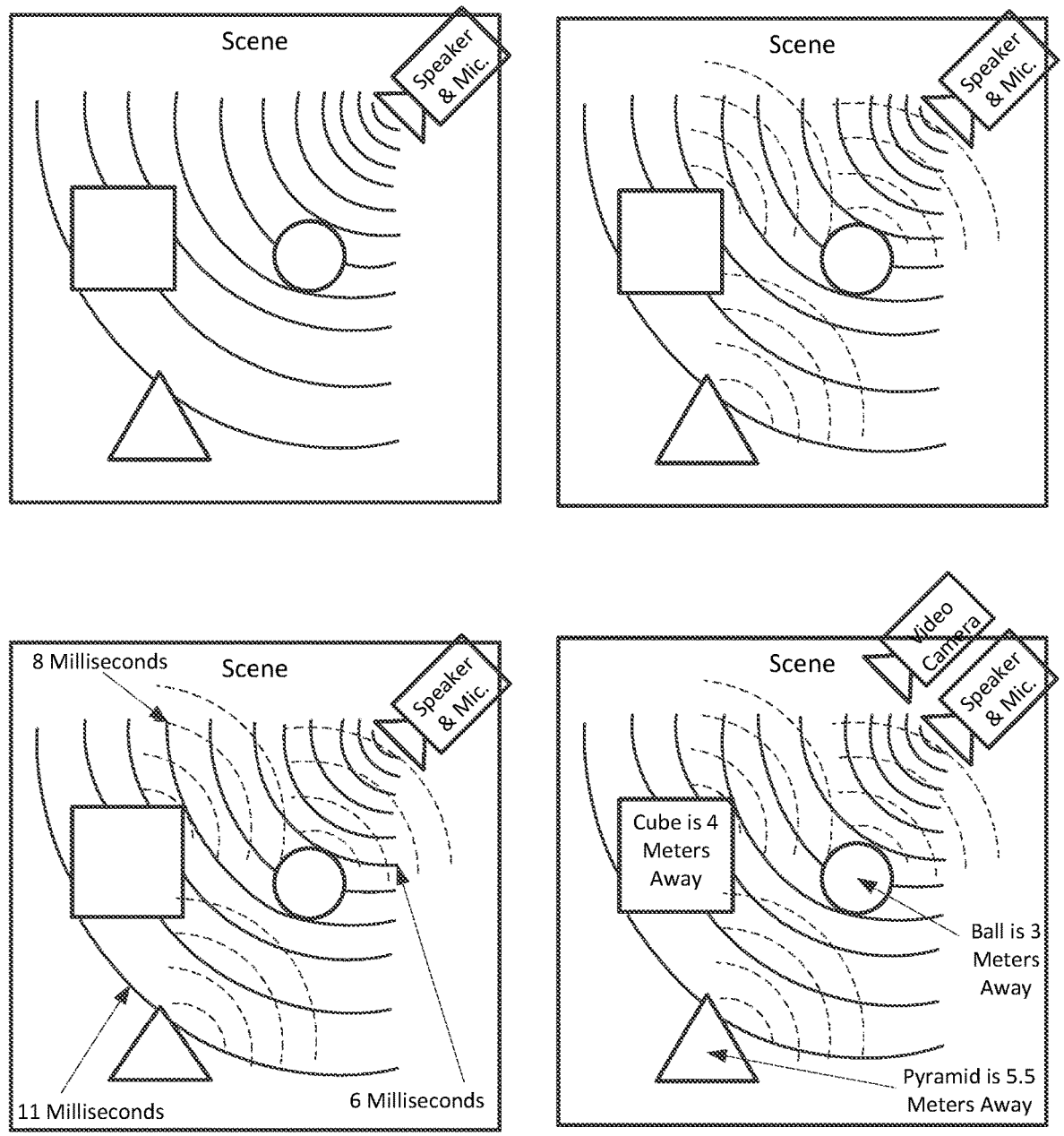
FIG. 7B shows diagrams exemplifying the main steps executed as part of an exemplary acoustic splash back method, including: scene having sound output, scene having sound bouncing, detected return, and scene with items tagged by estimated distance, in accordance with embodiments of the present invention.

In FIG. 7B there are shown diagrams exemplifying the main steps executed as part of an exemplary acoustic splash back method, including: scene having sound output; scene having sound bouncing; detected return; and scene with items tagged by estimated distance.

Figure 8:
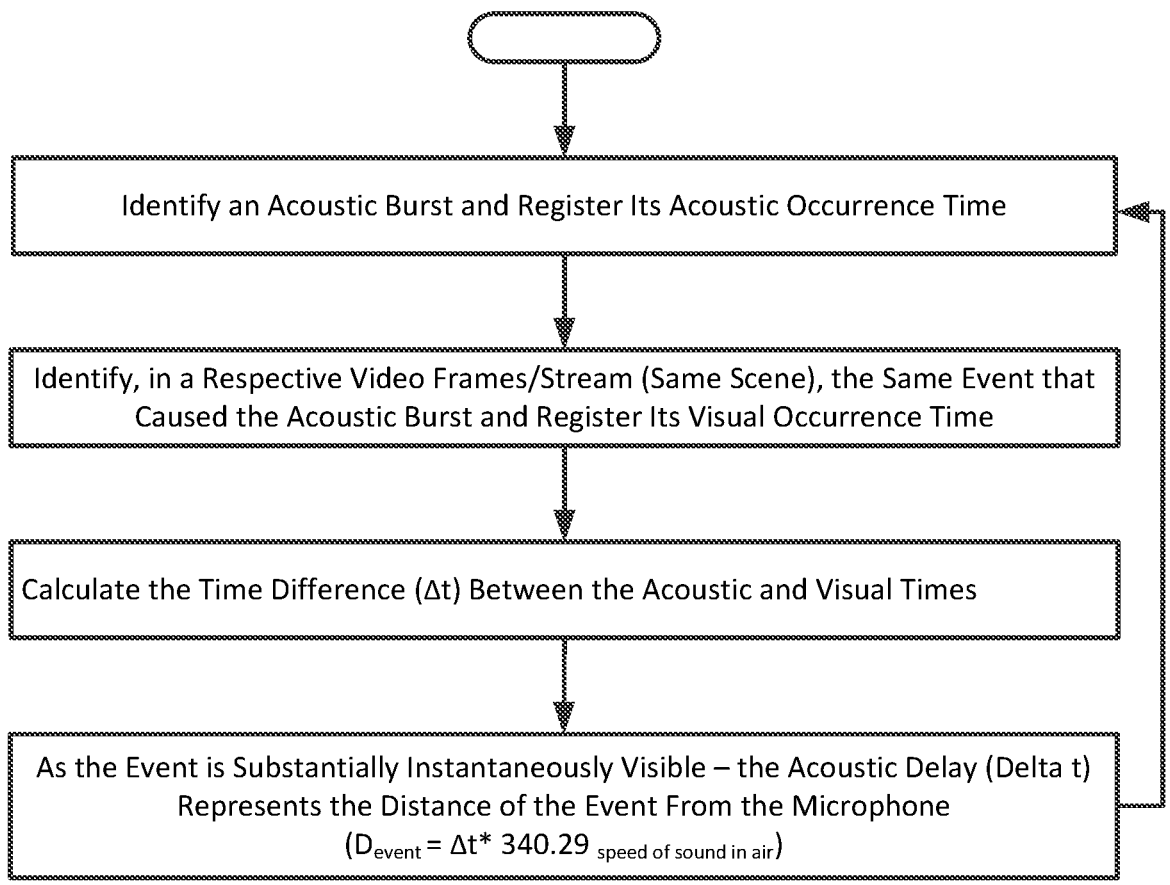
FIG. 8 is a flowchart of the main steps of an exemplary event distance detection method, including: hearing an acoustic burst, looking at corresponding video and counting a delta in offset between seeing the event and hearing the event, in accordance with embodiments of the present invention.

In FIG. 8 there is shown a flowchart of the main steps of an exemplary event distance detection method, including: hearing an acoustic burst; looking at corresponding video; feed; and counting delta in offset between seeing event and hearing event, in accordance with embodiments of the present invention.

According to some embodiments of the present invention, a method of registering one or more features within an image frame of a video stream may comprise: executing an edge detection algorithm for substantially each of a consecutive series of image frames to detect one or more dynamic edges across the consecutive series of image frames; tracking and parameterizing movement of detected dynamic edges across the consecutive series of image frames to generate a set of motion dynamic parameters; and correlating the motion dynamic parameters with a subject type and designating a pixel group adjacent to the one or more dynamic edges with the subject type.

According to some embodiments of the present invention, the method may further comprise: accessing a subject type specific motion data-store and correlating the motion dynamic parameters with a record of the data-store, wherein the record indicates a specific motion type; accessing an individual recognition specific individual data-store and correlating the motion dynamic parameters with a record of the data-store, wherein the record indicates a specific individual; identifying background elements in the video stream image frame; digitally correcting optical distortions caused by movements of an imaging device acquiring the video feed; digitally correcting optical distortions caused by imaging device lens having a known lens distortion; digitally correcting optical distortions caused by imaging device lens having an unknown lens distortion; executing an edge detection algorithm to detect one or more static edges of static elements across the consecutive series of image frames, and designating a static pixel group adjacent to the one or more of the static edges with a specific static element from within the static elements, when the video feed source is a static video camera; and/or executing an edge detection algorithm to detect one or more static edges of static elements across the consecutive series of image frames and designating a registered static pixel group adjacent to the one or more of the static edges with a specific static element from within the static elements, when the video feed source is a dynamic video camera.

According to some embodiments of the present invention, a method of estimating distances of one or more features within an image frame of a live video feed may comprise: identifying two or more objects within the image frame; estimating a relative distance order of identified objects; emitting an acoustic burst from a source at, or in proximity to, the video feed; detecting acoustic echo patterns and estimating distance of each pattern based on acoustic time of flight; and correlating at least one acoustic echo pattern estimated distance with an identified object within the image frame.

According to some embodiments of the present invention, a method of estimating a distance of one or more features within an image frame of an audio-video feed may comprise: detecting an audio burst starting on an audio channel of an audio-video feed, wherein a rising edge of the audio burst is associated with a first timestamp of the audio-video feed; identifying within the audio-video feed a video frame, acquired before the first timestamp, including an object-action which was a source of the audio burst, wherein an "object-action" is an action associated with one or more specific scene objects having an acoustic and a visual signature; calculating a temporal distance between acquisition of the frame with the object-action and the first timestamp; and estimating a physical distance of the object-action from a source device of the audio-video feed by multiplying an estimated speed of sound by the calculated temporal distance.

According to some embodiments of the present invention, a system for registering one or more features within an image frame of a video stream may comprise: a dynamic edge detector for executing an edge detection algorithm for substantially each of a consecutive series of image frames to detect one or more dynamic edges across the consecutive series of image frames; a dynamic edge vector dynamics analyzer for tracking and parameterizing movement of detected dynamic edges across the consecutive series of image frames to generate a set of motion dynamic parameters; a dynamic entity identification logic for correlating the motion dynamic parameters with a subject type; and a dynamic entity signature assigning logic for designating a pixel group adjacent to the one or more dynamic edges with the subject type.

According to some embodiments of the present invention, the system may further comprise: a dynamic action characterization logic for accessing a subject type specific motion data-store and correlating the motion dynamic parameters with a record of the data-store, wherein the record indicates a specific motion type; an individual recognition specific individual logic for accessing an individual recognition specific individual data-store and correlating the motion dynamic parameters with a record of the data-store, wherein the record indicates a specific individual; a static feature registration module for identifying background elements in the video stream image frame, a camera type and lens distortion compensation module for digitally correcting optical distortions caused by movements of an imaging device acquiring the video feed; a camera type and lens distortion compensation module for digitally correcting optical distortions caused by an imaging device lens having a known lens distortion; a camera type and lens distortion compensation module for digitally correcting optical distortions caused by an imaging device lens having an unknown lens distortion; a static edge detector for executing an edge detection algorithm for substantially each of a consecutive series of image frames to detect one or more static edges across the consecutive series of image frames, and a static element signature assigning logic for designating a static pixel group adjacent to the one or more of the static edges with a specific static element from within the static elements, when the video feed source is a static video camera; and/or a static edge detector for executing an edge detection algorithm for substantially each of a consecutive series of image frames to detect one or more static edges across the consecutive series of image frames and a static element signature assigning logic for designating a registered static pixel group adjacent to the one or more of the static edges with a specific static element from within the static elements, when the video feed source is a dynamic video camera.

According to some embodiments of the present invention, a video feed processing system may comprise: interface circuits to receive one or more two dimensional ("2D") video feeds; and processing circuitry executing instructions to: track and characterize moving elements present within the scene video feed; identify and characterize static elements or objects present within the scene video feed; define a three dimensional ("3D") coordinate set for the scene within boundaries of the scene video feed, wherein defining a three dimensional ("3D") coordinate set includes identifying one or more substantially straight edges, indicative of the X Y or Z axes of the scene and mapping the positions of the identified and characterized static elements or objects in relation to the identified straight edges; derive coordinates and orientation of the video feed source within the scene video feed coordinate frame; update a scene element inventory with characterization information relating to identified static elements, wherein updating is performed responsive to either newly derived characterization information or to refinement of existing characterization information; detect from within the tracked and characterized moving elements one or more humans in the scene video feed; and/or characterize and log an event associated with a detected human.

According to some embodiments, static element characterization information for a static element may include one or more of: (a) estimated dimensions of an element; (b) an element category; (c) estimated coordinates of one or more points on the static element; (d) a relationship with other elements in the scene; and/or (e) scene presence parameters.

According to some embodiments, characterization of a given static element may be at least partially derived from detected interactions between the given static element and a tracked moving element. According to some embodiments, scene boundary coordinates may be at least partially derived from detected interactions between a surface and a tracked moving element. According to some embodiments, characterization of a moving element detected as a human may include one or more of: (a) a human category; (b) a human's recognized identity; (c) a human's group affiliation or membership; and (d) a human's relationship to other humans identified in the scene.

According to some embodiments, the processing circuitry may be further adapted to: detect from within the tracked and characterized moving elements one or more non-human entities in the scene video feed, and wherein non-human entities may be selected from a group consisting of: animals, mechanically moving devices, static objects or plants affected by their environment, shadows, and displayed or projected images; and characterize and log an event associated with a detected non-human entity.

According to some embodiments, the system may further comprise an echo-ranging assembly in proximity with the video feed source and may include one or more acoustic emitters and one or more acoustic detectors. According to some embodiments, the echo-ranging assembly may include a combination of at least: one of the emitters and two of the detectors, or one of the detectors and two of the emitters, that may be utilized by the processing circuitry to perform stereo acoustic triangulation and derive directional information pertaining to the source of an acoustic flashback detected by at least one of the acoustic detectors. According to some embodiments, the acoustic emitter and/or the acoustic detector may be multi-directional and the processing circuitry may correlate a distance associated with a round-trip time of each of a set of detected echoes with each of a set of visually identified static elements or each of a set of tracked moving objects. According to some embodiments, the processing circuitry may generate a references echo map when no moving objects are detected with the scene. According to some embodiments, the processing circuitry may generate a references echo map when one or more moving objects are detected within the scene. According to some embodiments, deriving video feed source coordinates and orientation may include comparing an appearance of a given identified static element within the video feed against reference data corresponding to the identified object.

According to some embodiments of the present invention, some or all of the embodiments and/or features of a system for registering one or more features within an image frame of a video stream described above, may include interface circuits adapted to receive the video feed as one or more three dimensional ("3D") video feeds from any 3D camera type known today, or to be devised in the future.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A video feed processing system comprising:
   interface circuits to receive one or more two dimensional ("2D") video feeds; and
   processing circuitry executing instructions to:
   track and characterize moving elements present within the scene video feed;
   identify and characterize static elements or objects present within the scene video feed;
   define a three dimensional ("3D") coordinate set for the scene within boundaries of the scene video feed, wherein defining a three dimensional ("3D") coordinate set includes identifying one or more substantially straight edges, indicative of the X Y or Z axes of the scene and mapping the positions of the identified and characterized static elements or objects in relation to the identified straight edges;
   update a scene element inventory with characterization information relating to identified static elements, wherein updating is performed responsive to either newly derived characterization information or to refinement of existing characterization information;
   detect from within the tracked and characterized moving elements one or more humans in the scene video feed;
   wherein detection of one or more humans in the scene video is performed by a Dynamic Element Analysis Module which detects dynamic edges that may not be associated with background edges identified in the scene, groups dynamic edge vectors, measure relative motion dynamics between edge vectors of a (linked) group of dynamic edge vectors, and compares dynamic edge vector motion dynamics of the (linked) group of dynamic edge vectors to dynamic element reference tables.

2. The system according to claim 1, wherein static element characterization information for a static element includes one or more of: (a) estimated dimensions of an element; (b) an element category; (c) estimated coordinates of one or more points on the static element; (d) a relationship with other elements in the scene; and (e) scene presence parameters.

3. The system according to claim 1, wherein characterization of a given static element is at least partially derived from detected interactions between the given static element and a tracked moving element.

4. The system according to claim 1, wherein scene boundary coordinates are at least partially derived from detected interactions between a surface and a tracked moving element.

5. The system according to claim 1, wherein characterization of a moving element detected as a human includes one or more of: (a) a human category; (b) a human's recognized identity; (c) a human's group affiliation or membership; and (d) a human's relationship to other humans identified in the scene.

6. The system according to claim 1, wherein the processing circuitry is further adapted to detect from within the tracked and characterized moving elements one or more non-human entities in the scene video feed, and wherein non-human entities are selected from a group consisting of: animals, mechanically moving devices, static objects or plants affected by their environment, shadows, and displayed or projected images; and
characterize and log an event associated with a detected non-human entity.

7. The system according to claim 1, wherein said echo-ranging assembly includes a combination of at least: one of said emitters and two of said detectors, or one of said detectors and two of said emitters, utilized by said processing circuitry to perform stereo acoustic triangulation and derive directional information pertaining to the source of an acoustic flashback detected by at least one of said acoustic detectors.

8. The system according to claim 1, wherein said acoustic emitter and or said acoustic detector are multi-directional and said processing circuitry correlates a distance associated with a round-trip time of each of a set of detected echoes with each of a set of visually identified static elements or each of a set of tracked moving objects.

9. The system according to claim 1, wherein said processing circuitry generates a reference echo map when no moving objects are detected with the scene.

10. The system according to claim 1, wherein said processing circuitry generates a reference echo map when one or more moving objects are detected within the scene.

11. The system according to claim 1, wherein processing circuits are further adapted to derive video feed source coordinates and orientation by comparing an appearance of a given identified static element within the video feed against reference data corresponding to the identified object.

12. A method of video feed processing, said method system comprising:
electronically receiving one or more two-dimensional ("2D") video feeds;
algorithmically tracking and characterizing moving elements present within the scene video feed;
algorithmically identifying and characterizing static elements or objects present within the scene video feed;
defining a three-dimensional ("3D") coordinate set for the scene within boundaries of the scene video feed, wherein defining a three-dimensional ("3D") coordinate set includes identifying one or more substantially straight edges, indicative of the X Y or Z axes of the scene and mapping the positions of the identified and characterized static elements or objects in relation to the identified straight edges, wherein mapping the positions of the identified and characterized static elements or objects includes automatically echo-ranging one or more of the identified and characterized static elements or objects;
deriving coordinates and orientation of the video feed source within the scene video feed coordinate frame;
updating a scene element inventory with characterization information relating to identified static elements, wherein updating is performed responsive to either newly derived characterization information or to refinement of existing characterization information;
detecting from within the tracked and characterized moving elements one or more humans in the scene video feed; and
characterizing and logging an event associated with a detected human; wherein human detection includes detecting dynamic edges that may not be associated with background edges identified in the scene, grouping dynamic edge vectors, measuring relative motion dynamics between edge vectors of a (linked) group of dynamic edge vectors, and comparing dynamic edge vector motion dynamics of the (linked) group of dynamic edge vectors to dynamic element reference tables.

13. The method according to claim 12, wherein static element characterization information for a static element includes one or more of: (a) estimated dimensions of an element; (b) an element category; (c) estimated coordinates of one or more points on the static element; (d) a relationship with other elements in the scene; and (e) scene presence parameters.

14. The method according to claim 12, wherein characterization of a given static element is at least partially derived from detected interactions between the given static element and a tracked moving element.

15. The method according to claim 12, wherein scene boundary coordinates are at least partially derived from detected interactions between a surface and a tracked moving element.

16. The method according to claim 12, wherein characterization of a moving element detected as a human includes one or more of: (a) a human category; (b) a human's recognized identity; (c) a human's group affiliation or membership; and (d) a human's relationship to other humans identified in the scene.

17. The method according to claim 12, further including detecting from within the tracked and characterized moving elements one or more non-human entities in the scene video feed, and wherein non-human entities are selected from a group consisting of: animals, mechanically moving devices, static objects or plants affected by their environment, shadows, and displayed or projected images; and characterize and log an event associated with a detected non-human entity.

* * * * *